US012684483B2

(12) United States Patent (10) Patent No.: US 12,684,483 B2
Li (45) Date of Patent: Jul. 14, 2026

(54) PROCESSING METHOD AND APPARATUS FOR DISCONTINUOUS RECEPTION

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 349 days.

(21) Appl. No.: 17/783,176

(22) PCT Filed: Dec. 9, 2019

(86) PCT No.: PCT/CN2019/124113
§ 371 (c)(1),
(2) Date: Jun. 7, 2022

(87) PCT Pub. No.: WO2021/114049
PCT Pub. Date: Jun. 17, 2021

(65) Prior Publication Data
US 2023/0017216 A1 Jan. 19, 2023

(51) Int. Cl.
*H04W 52/02* (2009.01)
*H04W 76/28* (2018.01)

(52) U.S. Cl.
CPC ... *H04W 52/0235* (2013.01); *H04W 52/0232* (2013.01); *H04W 76/28* (2018.02)

(58) Field of Classification Search
CPC ......... H04W 52/0235; H04W 52/0232; H04W 76/28; H04W 52/0248; H04W 52/0216; Y02D 30/70
See application file for complete search history.

(56) References Cited

U.S. PATENT DOCUMENTS

| | | | |
|---|---|---|---|
| 2015/0131505 A1 | 5/2015 | Dai | |
| 2016/0286603 A1 | 9/2016 | Vajapeyam et al. | |
| 2018/0103427 A1* | 4/2018 | Griot | H04W 52/0225 |
| 2018/0270756 A1 | 9/2018 | Bhattad et al. | |
| 2018/0332655 A1* | 11/2018 | Ang | H04W 52/0216 |
| 2019/0281546 A1 | 9/2019 | Lim et al. | |
| 2020/0037247 A1* | 1/2020 | Liao | H04W 52/0216 |
| 2020/0112919 A1* | 4/2020 | Nam | H04B 7/0617 |
| 2022/0070778 A1 | 3/2022 | Li | |

FOREIGN PATENT DOCUMENTS

| | | |
|---|---|---|
| CN | 103582087 A | 2/2014 |
| CN | 105813177 A | 7/2016 |
| CN | 108200640 A | 6/2018 |
| CN | 109429306 A | 3/2019 |
| CN | 109923904 A | 6/2019 |

(Continued)

OTHER PUBLICATIONS

Ericsson, "DRX with short on-duration and Wake-up signaling", 3GPP TSG-RAN WG2 #98-AH, Tdoc R2-1707124, (Jun. 27-29, 2017).

(Continued)

*Primary Examiner* — Diane D Mizrahi
(74) *Attorney, Agent, or Firm* — Volpe Koenig

(57) ABSTRACT

A method for processing discontinuous reception (DRX), the method includes: configuring different power-saving signal configurations for a long period and a short period of at least one DRX group.

15 Claims, 4 Drawing Sheets

Configure different power-saving signal configurations for a long cycle and a short cycle of at least one discontinuous reception (DRX) group /S11

(56)     References Cited

FOREIGN PATENT DOCUMENTS

| | | | | |
|---|---|---|---|---|
| CN | 109952789 A | 6/2019 | | |
| CN | 110520840 A | 11/2019 | | |
| CN | 110546982 A | 12/2019 | | |
| CN | 110546999 A | 12/2019 | | |
| WO | WO-2018218683 A1 * | 12/2018 | ............ | H04W 52/02 |

OTHER PUBLICATIONS

ZTE Communication Co., Ltd., et al., "Introduction to LTE DRX Principle and Optimization Thinking," China Academic Journal Electronic publishing House. (2015).
Qualcomm Inc. "PDCCH-based power saving channel design", 3GPP TSG-RAN WG1 #99 R1-1912970, Nov. 22, 2019 (Nov. 22, 2019), section 2.1.1.2.
OPPO. "Impacts of PDCCH-based wake up signalling", 3GPP TSG-RAN WG2 Meeting #106 R2-1905603, May 17, 2019 (May 17, 2019), entire document.

* cited by examiner

13

Configure different power-saving signal configurations for a long cycle and a short cycle of at least one discontinuous reception (DRX) group     S11

Determine different power-saving signal configurations configured for a long cycle and a short cycle of at least one DRX group    S21

Processing apparatus for discontinuous reception (DRX)

Configuration unit    10

Sending processing unit    20

Processing apparatus for discontinuous reception (DRX)

Determining unit    30

Monitoring processing unit    40

900

PROCESSING METHOD AND APPARATUS FOR DISCONTINUOUS RECEPTION

CROSS REFERENCE TO RELATED APPLICATION

The present application is a U.S. National Stage of International Application No. PCT/CN2019/124113, filed on Dec. 9, 2019, the contents of all of which are incorporated herein by reference in their entireties for all purposes.

BACKGROUND

In order to meet the requirements for peak rate and system capacity improvement of user equipment (UE), a carrier aggregation (CA) feature is introduced in Release 10 in a long term evolution (LTE) system, and carrier aggregation can be divided into continuous carrier aggregation and discontinuous carrier aggregation. For continuous carrier aggregation, the user equipment only needs one transceiver, while for different frequency bands of discontinuous carrier aggregation, different radio frequency chains (RF chains) are needed.

SUMMARY

The present disclosure provides a method and apparatus for processing discontinuous reception.

According to a first aspect of the examples of the present disclosure, a method for processing discontinuous reception (DRX) is provided, including:

configuring, by a base station, different power-saving signal configurations for a long cycle and a short cycle of at least one DRX group.

According to a second aspect of the examples of the present disclosure, a method for processing discontinuous reception (DRX) is provided, including:

determining, by a user equipment (UE), different power-saving signal configurations configured for a long cycle and a short cycle of at least one DRX group.

According to a third aspect of the examples of the present disclosure, an apparatus for processing discontinuous reception (DRX) is provided, including:

a processor; and a memory configured to store processor executable instructions.

The processor is configured to implement any one above method for processing discontinuous reception (DRX) described in a technical solution applied to the base station side by executing the executable instructions.

According to a fourth aspect of the examples of the present disclosure, an apparatus for processing discontinuous reception (DRX) is provided, including:

a processor; and a memory configured to store processor executable instructions.

The processor is configured to implement any one above method for processing discontinuous reception (DRX) described in a technical solution applied to the UE side by executing the executable instructions.

According to a fifth aspect of examples of the present disclosure, a non-transitory storage medium is provided. The storage medium stores an executable program, where the executable program implements, when executed by a processor, steps of the method for processing discontinuous reception (DRX) according to the first aspect.

According to a sixth aspect of examples of the present disclosure, a non-transitory storage medium is provided. The storage medium stores an executable program, where the executable program implements, when executed by a processor, steps of the method for processing discontinuous reception (DRX) according to the second aspect.

It should be understood that the above general descriptions and the following detailed descriptions are illustrative and explanatory only and are not intended to limit the present disclosure.

BRIEF DESCRIPTION OF THE DRAWINGS

The accompanying drawings, which are incorporated in and constitute a part of this specification, illustrate examples consistent with the present disclosure and together with the specification serve to explain the principles of the present disclosure.

DETAILED DESCRIPTION

Examples will be described in detail herein, instances of which are illustrated in the accompanying drawings. When the following description refers to the accompanying drawings, the same numerals in different accompanying drawings refer to the same or similar elements unless otherwise indicated. The implementations described in the examples below are not intended to represent all implementations consistent with the example of the present application. Rather, they are merely instances of apparatuses and methods consistent with some aspects of the example of the present application, as recited in the appended claims.

The terms used in the examples of the present disclosure are only for the purpose of describing particular examples and are not intended to limit the examples of the present disclosure. As used in the examples of the present disclosure and the appended claims, the singular forms "a", "an" and "the" are intended to include the plural forms as well, unless the context clearly dictates otherwise. It will also be understood that the term "and/or" as used herein refers to including any and all possible combinations of one or more of the associated listed items.

It should be understood that although the terms "first", "second", "third", etc. may be used in examples of the present disclosure to describe various information, such information should not be limited to these terms. These terms are only used to distinguish the same type of information from each other. For example, the first information may also be referred to as the second information, and similarly, the second information may also be referred to as the first information without departing from the scope of the examples of the present disclosure. The words "when" and "if" used herein may be interpreted as "in the case of" or "at the time of" or "in response to determining" depending on the context.

Figures 1, 2:
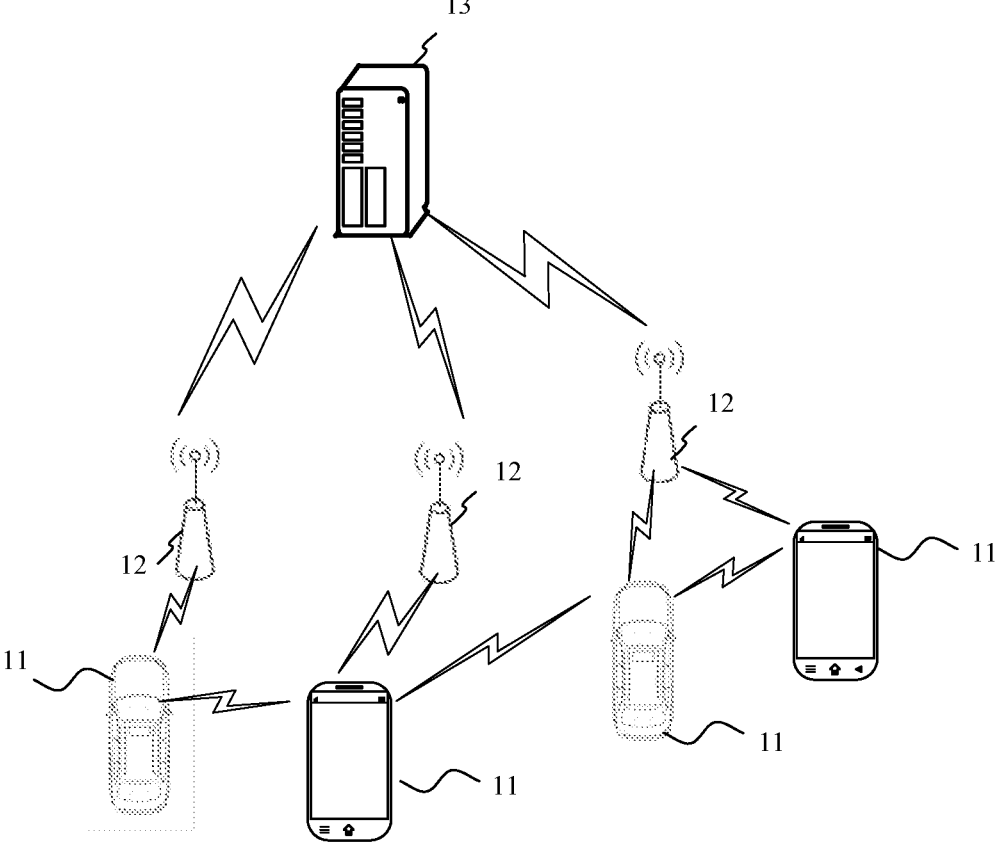
FIG. 1 is a schematic structural diagram of a wireless communication system illustrated according to an example.
FIG. 2 is a first flow diagram of a method for processing discontinuous reception (DRX) illustrated according to an example.

Please refer to FIG. 1 which is a schematic structural diagram of a wireless communication system according to an example of the present disclosure. As shown in FIG. 1, the wireless communication system is a communication system based on a cellular mobile communication technology, and may include: a plurality of terminals 11 and a plurality of base stations 12.

The terminals 11 may be devices providing voice and/or data connectivity to a user. The terminals 11 may communicate with one or more core networks via a radio access network (RAN). The terminals 11 may be Internet of Things terminals, such as sensor devices and mobile phones (or "cellular" phones), and computers with Internet of Things terminals, such as fixed, portable, pocket, hand-held, computer built-in or vehicle-mounted devices. For example, the terminals 11 may be stations (STAs), subscriber units, subscriber stations, mobile stations, mobiles, remote stations, access points, remote terminals, access terminals, user terminals, user agents, user devices, or user equipment (UE). Or, the terminals 11 may be devices of an unmanned aerial vehicle. Or, the terminals 11 may be vehicle-mounted devices, such as trip computers with a wireless communication function, or wireless communication devices connected to an external trip computer. Or, the terminals 11 may be roadside devices, such as streetlights with a wireless communication function, signal lights or other roadside devices.

The base stations 12 may be network-side devices in the wireless communication system. The wireless communication system may be a 4th generation mobile communication (4G) system which is also referred to as a long term evolution (LTE) system, or a 5G system which is also referred to as a new radio (NR) system or 5G NR system. Or, the wireless communication system may also be a next-generation system of the 5G system. An access network in the 5G system may be referred to as a new generation-radio access network (NG-RAN). Or, the wireless communication system may be a machine-type communication (MTC) system.

The base stations 12 may be evolved base stations in the 4G system (eNBs), or base stations with centralized distributed architecture in the 5G system (gNBs). In general, each base station 12 with the centralized distributed architecture includes a central unit (CU) and at least two distributed units (DUs). The central unit is provided with protocol stacks of a packet data convergence protocol (PDCP) layer, a radio link control (RLC) protocol layer, and a media access control (MAC) layer. The distributed units are provided with protocol stacks of a physical (PHY) layer. The specific implementation of the base stations 12 is not limited in the example of the present disclosure.

A wireless connection may be established between the base stations 12 and the terminals 11 through wireless radio. In different implementations, the wireless radio is wireless radio based on the standard of the 4th generation mobile communication network technology (4G), or wireless radio based on the standard of the 5th generation mobile communication network technology (5G), for example, new radio, or wireless radio based on the standard of a next-generation mobile communication network technology of 5G.

In some examples, an end to end (E2E) connection may also be established between the terminals 11, for example, vehicle to vehicle (V2V) communication, vehicle to infrastructure (V2I) communication and vehicle to pedestrian (V2P) communication in vehicle to everything (V2X) communication.

In some examples, the above wireless communication system may further include a network management device 13.

The plurality of base stations 12 are respectively connected to the network management device 13. The network management device 13 may be a core network device in the wireless communication system. For example, the network management device 13 may be a mobility management entity (MME) in an evolved packet core (EPC), or other core network devices, such as a serving gate way (SGW), a public data network gate way (PGW), a policy and charging rules function (PCRF) unit, or a home subscriber server (HSS). The implementation form of the network management device 13 is not limited in the example of the present disclosure.

In order to meet the requirements for peak rate and system capacity improvement of user equipment, a carrier aggregation (CA) feature was introduced in the 3rd generation partnership project (3GPP) Release10 of LTE, in which carrier aggregation may be divided into continuous carrier aggregation and discontinuous carrier aggregation. For continuous carrier aggregation, the UE only needs one transceiver, while for different frequency bands of discontinuous carrier aggregation, different radio frequency chains (RF chains) are needed. Hence, different DRX groups may be set according to different radio frequency chains used by the UE. Different DRX groups use a set of DRX parameters, such as using different onDurationTimer and drx-InactivityTimer. However, onDurationTimer is aligned, and different short cycle parameters such as shortDRX-Cycle and drxShortCycleTimer may be used.

In a power-saving project of 3GPP Release16, a power-saving signal is introduced, for example, the UE is informed of whether to wake up during the next onDuration period to monitor a physical downlink control channel (PDCCH). In the carrier aggregation (CA) scenario, the power-saving signal is only sent in a primary cell (Pcell), that is, the Pcell and a secondary cell (Scell) share a set of power-saving signal parameters. The power-saving signal may wake up all Pcells and Scells, or the power-saving signal may carry an identity document (ID) of the Pcell or Scell that needs to be woken up. However, after the introduction in a plurality of DRX groups, although the long cycles are aligned for different DRX groups, for the short cycles, if the configuration is inconsistent, for existing wake up signaling (WUS), it is not applicable to transmit a set of WUS parameters in a DRX group where the Pcell is located, which will increase the power consumption of the UE.

Based on the above wireless communication system, in order to save UE power, various examples of the method of the present disclosure are provided.

FIG. 2 is a first flow diagram of a method for processing discontinuous reception (DRX) illustrated according to an example. As shown in FIG. 2, the method for processing discontinuous reception (DRX) is applied in a base station, and includes the following step:

in step S11, different power-saving signal configurations are configured for a long cycle and a short cycle of at least one discontinuous reception (DRX) group.

In the example of the present disclosure, the power-saving signal configurations include:

signal parameters for configuring power-saving signals.

The signal parameters include one or more of the following information:

an effective range of a power-saving signal of the long cycle;

a transmission carrier of the power-saving signal of the long cycle;

start and end time of the power-saving signal of the long cycle; and a transmission cycle of the power-saving signal of the long cycle.

As an example, the effective range of the power-saving signal of the long cycle may be long-cycle DRX groups in all the DRX groups.

There are two cases of the long-cycle DRX groups in all the DRX groups:

1) The DRX long cycles of all the groups are the same. In this case, the long cycles of all the DRX groups may take this same value. For example, the long cycles of Group1 and Group2 are both 20 ms.

2) The long cycle of a certain Group is an integer multiple of another Group. In this case, the long cycles of all the DRX groups are the shortest value of all values. For example, the long cycle of Group1 is 20 ms; and the long cycle of Group2 is 40 ms. At this time, the power-saving signal is configured according to the shorter 20 ms.

In this way, the power consumption of UE for monitoring the power-saving signal can be reduced.

As an example, the power-saving signal of the long cycle is sent on a primary carrier. For example, the power-saving signal of the long cycle is sent on a primary cell (PCell) under a dual-link master cell group (MCG). For another example, the power-saving signal of the long cycle is sent on a primary secondary cell (PSCell) under a dual-link secondary cell group (SCG).

In this way, the power-saving signal of the long cycle is sent on the primary carrier, so that the power consumption of the UE for power-saving signal monitor can be reduced.

As an example, a time point corresponding to the start and end time of the power-saving signal of the long cycle may be a point of an offset value relative to a certain specified reference point. Specifically, the start and end time includes start time, and a time point corresponding to the start time is a point offset by a first offset with respect to a first specified reference point. For example, the first specified reference point is a start point of an on-duration configured for the long cycles of all the DRX groups.

As an example, the transmission cycle is the long cycles of all the DRX groups.

The signal parameters include one or more of the following information:

an effective range of a power-saving signal of the short cycle;

a transmission carrier of the power-saving signal of the short cycle; and start and end time of the power-saving signal of the short cycle.

As an example, the effective range of the power-saving signal of the short cycle is a short-cycle DRX group in each DRX group. Each DRX group may be a DRX group where a primary cell is located, or a DRX group where a secondary cell is located.

In this way, the power-saving signals of the short cycles of different DRX groups may be different, which is more conducive to reducing the power consumption of the UE for monitoring the power-saving signal. As an example, a time point corresponding to the start and end time of the power-saving signal of the short cycle may be a point of an offset value relative to a certain specified reference point. Specifically, the start and end time includes start time, and a time point corresponding to the start time is a point offset by a second offset with respect to a second specified reference point. For example, the second specified reference point is a start point of an on-duration configured for the short cycle of each DRX group or a start point configuration of an on-duration configured for a shorter short cycle in the DRX group currently entering in the short cycle.

There are two cases of the short-cycle DRX groups in the DRX groups:

1) One short cycle configuration is not an integer multiple of the other, that is, the completely misaligned situation.

2) Short cycle configurations are equal or one configuration is an integer multiple of the other.

Corresponding to the first case, the power-saving signal of each short cycle is sent separately.

Corresponding to the second case, the power-saving signal of short cycles may be placed on the primary carrier for unified transmission. In this case, the cycle is configured according to the shortest DRX cycle. For example, the short cycle of Group1 is 20 ms; and the short cycle of Group2 is 40 ms. If both Group1 and Group2 enter the short cycle at this time, the power-saving signal is configured according to the short 20 ms at this time; and if only one group currently enters the short cycle, the power-saving signal is configured according to the short cycle of the group.

As an example, the power-saving signal of the short cycle is sent on the primary carrier. For example, the power-saving signal of the short cycle is sent on the primary cell (PCell) under the dual-link MCG. For another example, the power-saving signal of the short cycle is sent on the primary secondary cell (PSCell) under the dual-link secondary cell group (SCG).

As an example, the power-saving signal of the short cycle is sent on a secondary carrier.

As an example, the secondary carrier configured to send the power-saving signal of the short cycle belongs to the DRX group. That is, the secondary carrier on which the short-cycle type power-saving signal is sent on the secondary carrier belongs to the DRX group. In this way, the flexibility of parameter configuration of the power-saving signal of the short cycle is improved, and the power consumption for monitoring the power-saving signal is also reduced.

As an example, the signal parameters further include a transmission cycle of the power-saving signal of the short cycle, and the transmission cycle is the short cycle of each DRX group or a shorter value configuration of the short cycle in the DRX group currently entering in the short cycle.

In the example of the present disclosure, the power-saving signal may be wake up signaling (WUS) or go to sleep (GTS).

In some examples, in step S11, it may be changed into that different power-saving configurations are configured for a long cycle and a short cycle of one or more DRX groups.

According to the technical solution provided by the example of the present disclosure, the base station configures the different power-saving signal configurations for the long cycle and the short cycle of at least one DRX group, so that the problem of large UE power consumption caused by configuring the same power-saving signal for the long cycle and the short cycle of the DRX group can be avoided.

In some examples, the configuring the different power-saving signal configurations for the long cycle and the short cycle of the at least one DRX group includes:

The power-saving signal for the long cycle of the DRX group is different from the power-saving signal for the short cycle of the DRX group.

In this way, the problem of large UE power consumption caused by configuring the same power-saving signal for the long cycle and the short cycle of the DRX group can be avoided.

In some examples, the configuring the different power-saving signal configurations for the long cycle and the short cycle of the at least one DRX group includes:

the power-saving signal is configured for the long cycle of the DRX group, and the power-saving signal is not configured for the short cycle.

In this way, the problem of increasing UE power consumption caused by inconsistent configuration of short-cycle DRX parameters in a plurality of DRX groups can be avoided.

Figure 3:
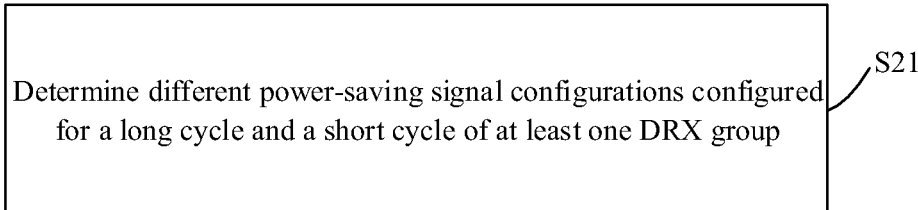
FIG. 3 is a second flow diagram of a method for processing discontinuous reception (DRX) illustrated according to an example.

FIG. 3 is a second flow diagram of a method for processing discontinuous reception (DRX) illustrated according to an example. As shown in FIG. 3, the method for processing discontinuous reception (DRX) is applied in UE, and includes the following step:

in step S21, different power-saving signal configurations configured for a long cycle and a short cycle of at least one DRX group are determined.

The power-saving signal configurations include:

signal parameters for configuring power-saving signals.

In some examples, the signal parameters include one or more of the following information:

an effective range of a power-saving signal of the long cycle;

a transmission carrier of the power-saving signal of the long cycle;

start and end time of the power-saving signal of the long cycle; and a transmission cycle of the power-saving signal of the long cycle.

In this way, if the UE is located in a long-cycle DRX group, the power-saving signal of the long cycle is monitored, so that the power consumption for monitoring the power-saving signal is reduced.

For example, the effective range of the power-saving signal of the long cycle is long-cycle DRX groups in all the DRX groups.

For example, the transmission carrier of the power-saving signal of the long cycle is a primary carrier.

For example, for the start and end time of the power-saving signal of the long cycle, the start and end time includes start time, a time point corresponding to the start time is a point offset by a first offset with respect to a first specified reference point, and the first specified reference point is a start point of an on-duration configured for the long cycles of all the DRX groups.

For example, the transmission cycle of the power-saving signal of the long cycle is the long cycles of all the DRX groups.

In some examples, the signal parameters include one or more of the following information:

an effective range of a power-saving signal of the short cycle;

a transmission carrier of the power-saving signal of the short cycle;

start and end time of the power-saving signal of the short cycle; and a transmission cycle of the power-saving signal of the short cycle.

In this way, if the UE is located in a short-cycle DRX group, the power-saving signal of the short cycle is monitored, so that the power consumption for monitoring the power-saving signal is reduced.

For example, the effective range of the power-saving signal of the short cycle is a short-cycle DRX group in each DRX group.

For example, the transmission carrier of the power-saving signal of the short cycle is a primary carrier or a secondary carrier.

For example, for the start and end time of the power-saving signal of the short cycle, the start and end time includes start time, a time point corresponding to the start time is a point offset by a second offset with respect to a second specified reference point, and the second specified reference point is a start point of an on-duration configured for the short cycle of each DRX group or a start point configuration of an on-duration configured for a shorter short cycle in the DRX group currently entering in the short cycle.

For example, the transmission cycle of the power-saving signal of the short cycle is the short cycle of each DRX group or a shorter value configuration of the short cycle in the DRX group currently entering in the short cycle.

In some examples, the configuring the different power-saving signal configurations for the long cycle and the short cycle of at least one DRX group include:

different power-saving signals are configured for the long cycle and the short cycle of the DRX group; or, the power-saving signal is configured for the long cycle of the DRX group, and the power-saving signal is not configured for the short cycle of the DRX group.

In this way, the UE may receive the power-saving signal suitable for the cycle type according to the cycle type of the current DRX group, so that the problem that the power consumption of the UE is increased by inconsistent cycle configurations of short-cycle DRX groups in a plurality of DRX groups is avoided.

In the example of the present disclosure, the power-saving signal may be wake up signaling (WUS) or go to sleep (GTS).

By adopting the technical solutions described in the example of the present disclosure, the UE may conveniently monitor the power-saving signal according to the cycle type of the current DRX group, and then determine the corresponding DRX parameter for channel monitoring according to the monitored power-saving signal and perform the corresponding channel monitoring according to the DRX parameter, so as to achieve the purpose of saving power.

Figure 4:
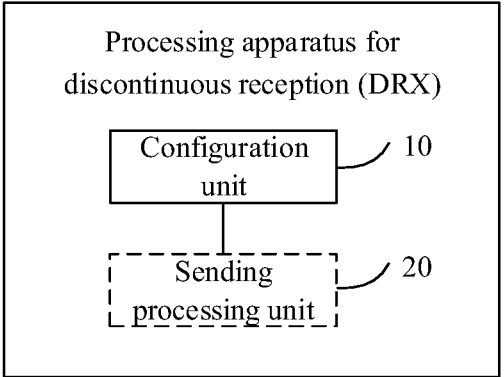
FIG. 4 is a first block diagram of an apparatus for processing discontinuous reception (DRX) illustrated according to an example.

FIG. 4 is a first block diagram of an apparatus for processing discontinuous reception (DRX) illustrated according to an example. The apparatus for processing discontinuous reception (DRX) is applied on a base station side. Referring to FIG. 4, the apparatus includes a configuration unit 10.

The configuration unit 10 is configured to configure different power-saving signal configurations for a long cycle and a short cycle of at least one DRX group.

In the above solution, the configuration unit 10 is configured to:

configure the power-saving signal for the long cycle of the DRX group to be different from power-saving signal for the short cycle of the DRX group;
or, configure the power-saving signal for the long cycle of the DRX group, and not configure the power-saving signal for the short cycle.

In the above solution, the power-saving signal configurations include:

signal parameters for configuring the power-saving signals.

In the above solution, the signal parameters include one or more of the following information:

an effective range of the power-saving signal of the long cycle;

a transmission carrier of the power-saving signal of the long cycle;

start and end time of the power-saving signal of the long cycle; and a transmission cycle of the power-saving signal of the long cycle.

For example, the effective range of the power-saving signal of the long cycle is long-cycle DRX groups in all the DRX groups.

For example, the transmission carrier of the power-saving signal of the long cycle is a primary carrier.

For example, for the start and end time of the power-saving signal of the long cycle, the start and end time includes start time, a time point corresponding to the start time is a point offset by a first offset with respect to a first specified reference point, and the first specified reference point is a start point of an on-duration configured for long cycles of all the DRX groups.

For example, the transmission cycle of the power-saving signal of the long cycle is the long cycles of all the DRX groups.

In the above solution, the signal parameters include one or more of the following information:

an effective range of the power-saving signal of the short cycle;

a transmission carrier of the power-saving signal of the short cycle;

start and end time of the power-saving signal of the short cycle; and a transmission cycle of the power-saving signal of the short cycle.

For example, the effective range of the power-saving signal of the short cycle is a short-cycle DRX group in each DRX group.

For example, the transmission carrier of the power-saving signal of the short cycle is a primary carrier or a secondary carrier.

For example, for the start and end time of the power-saving signal of the short cycle, the start and end time includes start time, a time point corresponding to the start time is a point offset by a second offset with respect to a second specified reference point, and the second specified reference point is a start point of an on-duration configured for the short cycle of each DRX group or a start point configuration of an on-duration configured for a shorter short cycle in the DRX group currently entering in the short cycle.

For example, the transmission cycle of the power-saving signal of the short cycle is the short cycle of each DRX group or a shorter value configuration of the short cycle in the DRX group currently entering in the short cycle.

In the above solution, each DRX group is a DRX group where a primary cell is located, or a DRX group where a secondary cell is located.

In the above solution, the power-saving signal is wake up signaling (WUS) or go to sleep (GT S).

In the above solution, the apparatus may further include:

a sending processing unit 20, configured to send the power-saving signal based on the power-saving signal configurations.

Regarding the apparatus in the above example, the specific manner in which each module performs operations has been described in detail in the example of the method and will not be described in detail here.

In practical applications, the specific structures of the configuration unit 10 and the sending processing unit 20 may be implemented by the apparatus for processing discontinuous reception (DRX) or a central processing unit (CPU), a micro controller unit (MCU), a digital signal processor (DSP), a programmable logic controller (PLC) or the like in a base station to which the apparatus for processing discontinuous reception (DRX) belongs.

The apparatus for processing discontinuous reception (DRX) according to the example may be disposed on the base station side.

Those skilled in the art should understand that the functions of each processing module in the apparatus for processing discontinuous reception (DRX) according to the example of the present disclosure may be understood by referring to the foregoing description of the method for processing discontinuous reception (DRX) applied to the base station side. Each processing module in the apparatus for processing discontinuous reception (DRX) according to the example of the present disclosure may be implemented by an analog circuit that implements the functions described in the example of the present disclosure or may be implemented by running software executing the functions described in the example of the present disclosure on a terminal.

The apparatus for processing discontinuous reception (DRX) according to the example of the present disclosure can reduce the power consumption for monitoring the power-saving signal.

Figure 5:
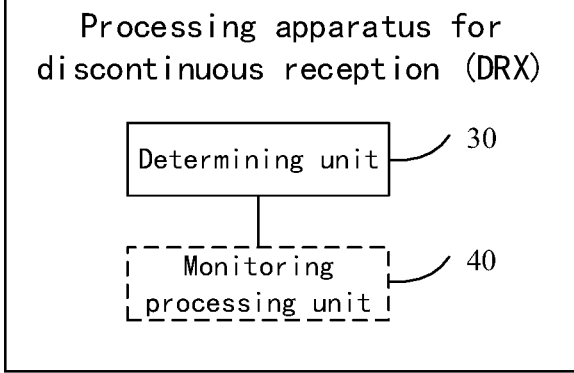
FIG. 5 is a second block diagram of an apparatus for processing discontinuous reception (DRX) illustrated according to an example.

FIG. 5 is a second block diagram of an apparatus for processing discontinuous reception (DRX) illustrated according to an example. The apparatus for processing discontinuous reception (DRX) is applied on a UE side. Referring to FIG. 5, the apparatus includes a determining unit 30.

The determination unit 30 is configured to: determine different power-saving signal configurations configured for a long cycle and a short cycle of at least one DRX group.

In the above solution, the different power-saving signal configurations configured for the long cycle and the short cycle of the at least one DRX group include:

the power-saving signal for the long cycle of the DRX group is different from power-saving signal for the short cycle of the DRX group; or, the power-saving signal is configured for the long cycle of the DRX group, and the power-saving signal is not configured for the short cycle of the DRX group.

In the above solution, the power-saving signal configurations include:

signal parameters for configuring the power-saving signals.

In the above solution, signal parameters include one or more of the following information:

an effective range of the power-saving signal of the long cycle;

a transmission carrier of the power-saving signal of the long cycle;

start and end time of the power-saving signal of the long cycle; and a transmission cycle of the power-saving signal of the long cycle.

For example, the effective range of the power-saving signal of the long cycle is long-cycle DRX groups in all the DRX groups.

For example, the transmission carrier of the power-saving signal of the long cycle is a primary carrier.

For example, for the start and end time of the power-saving signal of the long cycle, the start and end time includes start time, a time point corresponding to the start time is a point offset by a first offset with respect to a first specified reference point, and the first specified reference point is a start point of an on-duration configured for long cycles of all the DRX groups.

For example, the transmission cycle of the power-saving signal of the long cycle is the long cycles of all the DRX groups.

In the above solution, the signal parameters include one or more of the following information:

an effective range of the power-saving signal of the short cycle;

a transmission carrier of the power-saving signal of the short cycle;

start and end time of the power-saving signal of the short cycle; and a transmission cycle of the power-saving signal of the short cycle.

For example, the effective range of the power-saving signal of the short cycle is a short-cycle DRX group in each DRX group.

For example, the transmission carrier of the power-saving signal of the short cycle is a primary carrier or a secondary carrier.

For example, for the start and end time of the power-saving signal of the short cycle, the start and end time includes start time, a time point corresponding to the start time is a point offset by a second offset with respect to a second specified reference point, and the second specified reference point is a start point of an on-duration configured for the short cycle of each DRX group or a start point configuration of an on-duration configured for a shorter short cycle in the DRX group currently entering in the short cycle.

For example, the transmission cycle of the power-saving signal of the short cycle is the short cycle of each DRX group or a shorter value configuration of the short cycle in the DRX group currently entering in the short cycle.

In the above solution, the power-saving signal is wake up signaling (WUS) or go to sleep (GT S).

In the above solution, the apparatus may further include:

a monitoring processing unit 40, configured to monitor the power-saving signal.

Regarding the apparatus in the above example, the specific manner in which each module performs operations has been described in detail in the example of the method and will not be described in detail here.

In practical applications, the specific structures of the determining unit 30 and the monitoring processing unit 40 may be implemented by the apparatus for processing discontinuous reception (DRX) or a CPU, an MCU, a DSP, a PLC or the like in UE to which the apparatus for processing discontinuous reception (DRX) belongs.

The apparatus for processing discontinuous reception (DRX) according to the example may be disposed on the UE side.

Those skilled in the art should understand that the functions of each processing module in the apparatus for processing discontinuous reception (DRX) according to the example of the present disclosure may be understood by referring to the foregoing description of the method for processing discontinuous reception (DRX) applied to the UE side. Each processing module in the apparatus for processing discontinuous reception (DRX) according to the example of the present disclosure may be implemented by an analog circuit that implements the functions described in the example of the present disclosure or may be implemented by running software executing the functions described in the example of the present disclosure on a terminal.

The apparatus for processing discontinuous reception (DRX) according to the example of the present disclosure can reduce the power consumption for monitoring the power-saving signal.

Figure 6:
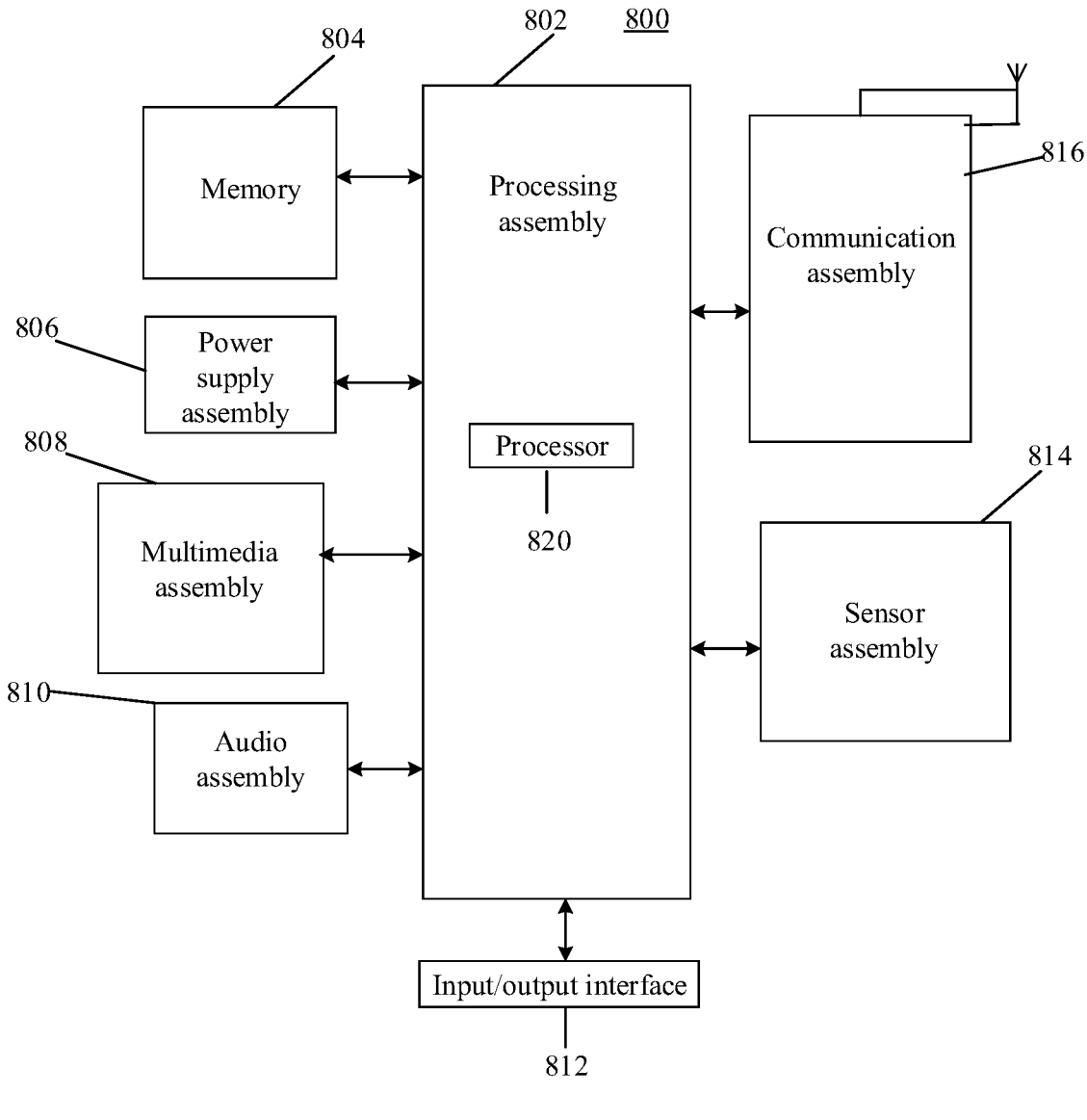
FIG. 6 is a first block diagram of an apparatus 800 for discontinuous reception (DRX) processing illustrated according to an example.

FIG. 6 is a block diagram of an apparatus 800 for discontinuous reception (DRX) processing illustrated according to an example. For example, the apparatus 800 may be a mobile phone, a computer, a digital broadcasting terminal, a messaging device, a game console, a tablet device, a medical device, a fitness device, a personal digital assistant, etc.

Referring to FIG. 6, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the apparatus 800, such as operations associated with display, telephone call, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the apparatus 800. Instances of these data include instructions for any application or method operating on the apparatus 800, contact data, phonebook data, messages, pictures, videos, etc. The memory 804 may be implemented by any type of volatile or non-volatile storage devices or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or a compact disc.

The power component 806 provides power for various components of the apparatus 800. The power component 806 may include a power management system, one or more power sources, and other components associated with generating, managing and distributing power for the apparatus 800.

The multimedia component 808 includes a screen providing an output interface between the apparatus 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, swiping and gestures on the touch panel. The touch sensor can not only sense the boundary of the touch or swiping operation, but also detect the duration and pressure related to the touch or swiping operation. In some examples, the multimedia component 808 includes a front camera and/or a rear camera. When the apparatus 800 is in an operation mode, such as a shooting mode or a video mode, the front camera and/or the rear camera may receive external multimedia data. Each of the front camera and the rear camera may be a fixed optical lens system or has a focal length and optical zoom capability.

The audio component 810 is configured to output and/or input audio signals. For example, the audio component 810 includes a microphone (MIC), and when the apparatus 800 is in an operation mode, such as a call mode, a recording mode, or a voice recognition mode, the microphone is configured to receive external audio signals. The received audio signal may be further stored in the memory 804 or transmitted via the communication component 816. In some examples, the audio component 810 also includes a speaker for outputting an audio signal.

The I/O interface 812 provides an interface between the processing component 802 and a peripheral interface module which may be a keyboard, a click wheel, a button, etc. These buttons may include but are not limited to: a home button, volume buttons, a start button and a lock button.

The sensor component 814 includes one or more sensors for providing state evaluation of various aspects of the apparatus 800. For example, the sensor component 814 may detect an on/off state of the apparatus 800 and the relative positioning of the components, for example, the component is a display and a keypad of the apparatus 800. The sensor component 814 may also detect the change of the position of the apparatus 800 or one component of the apparatus 800, the presence or absence of user contact with the apparatus 800, the azimuth or acceleration/deceleration of the apparatus 800, and temperature change of the apparatus 800. The sensor component 814 may include a proximity sensor configured to detect the presence of nearby objects without any physical contact. The sensor component 814 may also include an optical sensor, such as a complementary metal oxide semiconductor (CMOS) or a charge-coupled device (CCD) image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate a wired or wireless communication between the apparatus 800 and other devices. The apparatus 800 may access a wireless network based on a communication standard, such as WiFi, 2G or 3G, or their combinations. In one example, the communication component 816 receives broadcast signals or broadcast related information from an external broadcast management system via a broadcast channel. In one example, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology and other technologies.

In examples, the apparatus 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to perform the above method for processing discontinuous reception (DRX) applied on the user equipment side.

In examples, there is also provided a non-transitory computer-readable storage medium including executable instructions, such as the memory 804 including executable instructions, which may be executed by the processor 820 of the apparatus 800 to perform the above method. For example, the non-transitory computer-readable storage medium may be a ROM, a random access memory (RAM), a CD-ROM, a magnetic tape, a floppy disk, an optical data storage device, and the like.

Figure 7:
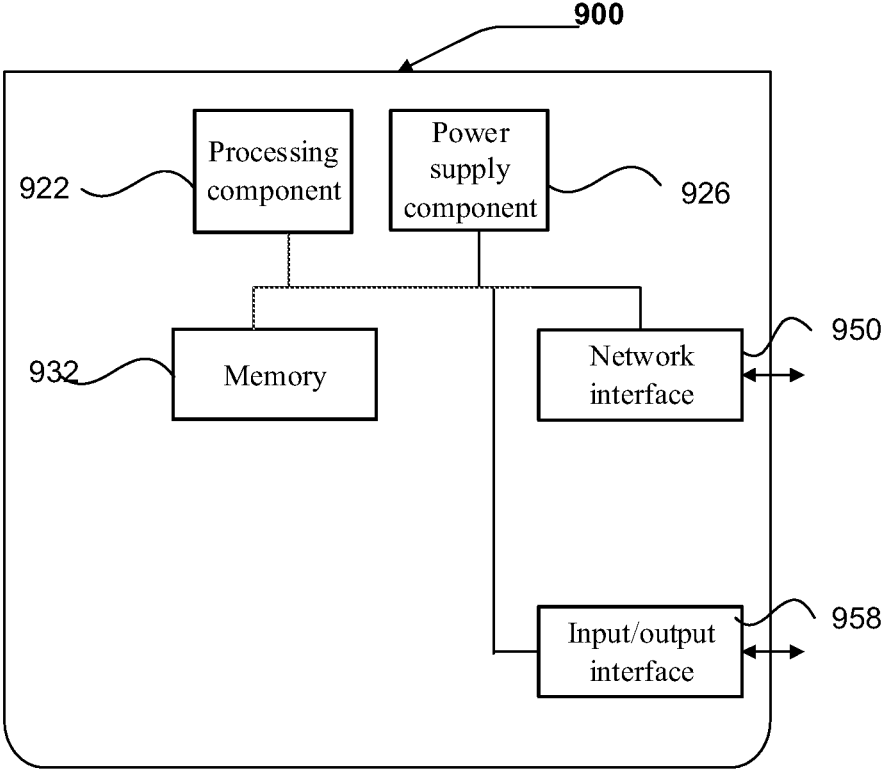
FIG. 7 is a second block diagram of an apparatus 900 for discontinuous reception (DRX) processing illustrated according to an example.

FIG. 7 is a block diagram of an apparatus 900 for discontinuous reception (DRX) processing illustrated according to an example. For example, the apparatus 900 may be provided as a server. Referring to FIG. 7, the apparatus 900 includes a processing component 922, which further includes one or more processors, and a memory resource, represented by a memory 932, for storing instructions executable by the processing component 922, such as an application program. The application program stored in the memory 932 may include one or more modules, each corresponding to a set of instructions. In addition, the processing component 922 is configured to execute the instructions to execute the above method for processing discontinuous reception (DRX) applied on the base station side.

The apparatus 900 may further include a power supply component 926 configured to perform power management of the apparatus 900, a wired or wireless network interface 950 configured to connect the apparatus 900 to a network, and an input output (I/O) interface 958. The apparatus 900 may operate based on an operating system stored in the memory 932, such as Windows Server™, Mac OS X™, Unix™, Linux™, FreeBSD™ or the like.

The technical solutions described in the examples of the present disclosure may be combined arbitrarily without conflict.

Other examples of the present disclosure will be apparent to those skilled in the art from consideration of the specification and practice of the disclosure herein. The present application is intended to cover any variations, uses, or adaptations of the disclosure following the general principles of the present disclosure and including such departures from the disclosure as come within known or customary practice in the art. It is intended that the specification and examples be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure only be limited by the appended claims.

According to a first aspect of the examples of the present disclosure, a method for processing discontinuous reception (DRX) is provided, including:

configuring, by a base station, different power-saving signal configurations for a long cycle and a short cycle of at least one DRX group.

In some examples, where configuring different power-saving signal configurations for the long cycle and the short cycle of at least one DRX group includes:

configuring different power-saving signals for the long cycle and the short cycle of the DRX group;
or,
configuring the power-saving signal for the long cycle of the DRX group, and not configuring the power-saving signal for the short cycle of the DRX group.

In some examples, where the power-saving signal configurations include:
signal parameters for configuring power-saving signals.

In some examples, where the signal parameters include one or more of the following information:
an effective range of a power-saving signal of the long cycle, where the effective range is long-cycle DRX group in all the DRX groups;
a transmission carrier of the power-saving signal of the long cycle, where the transmission carrier is a primary carrier;
start and end time of the power-saving signal of the long cycle, where the start and end time includes start time, a time point corresponding to the start time is a point offset by a first offset with respect to a first specified reference point, and the first specified reference point is a start point of an on-duration configured for long cycles of all the DRX groups; and
a transmission cycle of the power-saving signal of the long cycle, where the transmission cycle is the long cycle of all the DRX groups.

In some examples, where the signal parameters include one or more of the following information:
an effective range of a power-saving signal of the short cycle, where the effective range is a short-cycle DRX group in each DRX group;
a transmission carrier of the power-saving signal of the short cycle, where the transmission carrier is a primary carrier or a secondary carrier;
start and end time of the power-saving signal of the short cycle, where the start and end time includes start time, a time point corresponding to the start time is a point offset by a second offset with respect to a second specified reference point, and the second specified reference point is a start point of an on-duration configured for the short cycle of each DRX group or a start point configuration of an on-duration configured for a shorter short cycle in the DRX group currently entering in the short cycle; and
a transmission cycle of the power-saving signal of the short cycle, where the transmission cycle is the short cycle of each DRX group or a shorter value configuration of the short cycle in the DRX group currently entering in the short cycle.

In some examples, where the power-saving signal is wake up signaling (WUS) or go to sleep (GTS).

According to a second aspect of the examples of the present disclosure, a method for processing discontinuous reception (DRX) is provided, including:
determining, by a user equipment (UE), different power-saving signal configurations configured for a long cycle and a short cycle of at least one DRX group.

In some examples, where the different power-saving signal configurations configured for the long cycle and the short cycle of the at least one DRX group include:
configuring different power-saving signals for the long cycle and the short cycle of the DRX group;
or,
configuring the power-saving signal for the long cycle of the DRX group, and not configuring the power-saving signal for the short cycle of the DRX group.

In some examples, where, the power-saving signal configurations include:
signal parameters for configuring the power-saving signals.

In some examples, where, the signal parameters include one or more of the following information:
an effective range of the power-saving signal of the long cycle, where the effective range is long-cycle DRX groups in all the DRX groups;
a transmission carrier of the power-saving signal of the long cycle, where the transmission carrier is a primary carrier;
start and end time of the power-saving signal of the long cycle, where the start and end time includes start time, a time point corresponding to the start time is a point offset by a first offset with respect to a first specified reference point, and the first specified reference point is a start point of an on-duration configured for long cycles of all the DRX groups; and
a transmission cycle of the power-saving signal of the long cycle, where the transmission cycle is the long cycles of all the DRX groups.

In some examples, where, the signal parameters include one or more of the following information:
an effective range of the power-saving signal of the short cycle, where the effective range is a short-cycle DRX group in each DRX group;
a transmission carrier of the power-saving signal of the short cycle, where the transmission carrier is a primary carrier or a secondary carrier;
start and end time of the power-saving signal of the short cycle, where the start and end time includes start time, a time point corresponding to the start time is a point offset by a second offset with respect to a second specified reference point, and the second specified reference point is a start point of an on-duration configured for the short cycle of each DRX group or a start point configuration of an on-duration configured for a shorter short cycle in the DRX group currently entering in the short cycle; and
a transmission cycle of the power-saving signal of the short cycle, where the transmission cycle is the short cycle of each DRX group or a shorter value configuration of the short cycle in the DRX group currently entering in the short cycle.

In some examples, where, the power-saving signal is wake up signaling (WUS) or go to sleep (GTS).

According to a third aspect of the examples of the present disclosure, an apparatus for processing discontinuous reception (DRX) is provided, including:
a configuration unit, configured to: configure different power-saving signal configurations for a long cycle and a short cycle of at least one DRX group.

According to a fourth aspect of the examples of the present disclosure, an apparatus for processing discontinuous reception (DRX) is provided, including:
a determining unit, configured to: determine different power-saving signal configurations configured for a long cycle and a short cycle of at least one DRX group.

What is claimed is:
1. A method for processing discontinuous reception (DRX), comprising:
configuring, by a base station, different power-saving signal configurations for a long cycle and a short cycle of at least one DRX group, wherein different DRX groups are set according to different radio frequency chains used by a user equipment (UE);

wherein configuring different power-saving signal configurations for the long cycle and the short cycle of at least one DRX group comprises: configuring different power-saving signals for the long cycle and the short cycle of the DRX group;

wherein the power-saving signal configurations comprise signal parameters for configuring power-saving signals;

wherein the signal parameters comprise;

an effective range of a power-saving signal of the long cycle, wherein the effective range is long-cycle DRX group in all the DRX groups;

start and end time of the power-saving signal of the long cycle, wherein the start and end time comprises start time, a time point corresponding to the start time is a point offset by a first offset with respect to a first specified reference point, and the first specified reference point is a start point of an on-duration configured for long cycles of all the DRX groups; and a transmission cycle of the power-saving signal of the long cycle, wherein the transmission cycle is the long cycle of all the DRX groups.

2. The method according to claim 1, wherein the signal parameters further comprise:

a transmission carrier of the power-saving signal of the long cycle, wherein the transmission carrier is a primary carrier.

3. The method according to claim 1, wherein the signal parameters further comprise one or more of the following information:

an effective range of a power-saving signal of the short cycle, wherein the effective range is a short-cycle DRX group in each DRX group;

a transmission carrier of the power-saving signal of the short cycle, wherein the transmission carrier is a primary carrier or a secondary carrier;

start and end time of the power-saving signal of the short cycle, wherein the start and end time comprises start time, a time point corresponding to the start time is a point offset by a second offset with respect to a second specified reference point, and the second specified reference point is a start point of an on-duration configured for the short cycle of each DRX group or a start point configuration of an on-duration configured for a shorter short cycle in the DRX group currently entering in the short cycle; and a transmission cycle of the power-saving signal of the short cycle, wherein the transmission cycle is the short cycle of each DRX group or a shorter value configuration of the short cycle in the DRX group currently entering in the short cycle.

4. The method according to claim 1, wherein the power-saving signal is wake up signaling (WUS) or go to sleep (GTS).

5. The method according to claim 1, wherein configuring different power-saving signal configurations for the long cycle and the short cycle of at least one DRX group comprises:

configuring the power-saving signal for the long cycle of the DRX group, and not configuring the power-saving signal for the short cycle of the DRX group.

6. A non-transitory storage medium, storing an executable program, wherein the executable program implements, when executed by a processor, steps of the method for processing discontinuous reception (DRX) according to claim 1.

7. A method for processing discontinuous reception (DRX), comprising:

determining, by a user equipment (UE), different power-saving signal configurations configured for a long cycle and a short cycle of at least one DRX group, wherein different DRX groups are set according to different radio frequency chains used by the UE;

wherein the different power-saving signal configurations configured for the long cycle and the short cycle of the at least one DRX group comprise: different power-saving signals for the long cycle and the short cycle of the DRX group;

wherein the power-saving signal configurations comprise signal parameters for configuring power-saving signals;

wherein the signal parameters comprise;

an effective range of a power-saving signal of the long cycle, wherein the effective range is long-cycle DRX group in all the DRX groups;

start and end time of the power-saving signal of the long cycle, wherein the start and end time comprises start time, a time point corresponding to the start time is a point offset by a first offset with respect to a first specified reference point, and the first specified reference point is a start point of an on-duration configured for long cycles of all the DRX groups; and a transmission cycle of the power-saving signal of the long cycle, wherein the transmission cycle is the long cycle of all the DRX groups.

8. The method according to claim 7, wherein, the signal parameters further comprise:

a transmission carrier of the power-saving signal of the long cycle, wherein the transmission carrier is a primary carrier.

9. The method according to claim 7, wherein, the signal parameters further comprise one or more of the following information:

an effective range of the power-saving signal of the short cycle, wherein the effective range is a short-cycle DRX group in each DRX group;

a transmission carrier of the power-saving signal of the short cycle, wherein the transmission carrier is a primary carrier or a secondary carrier;

start and end time of the power-saving signal of the short cycle, wherein the start and end time comprises start time, a time point corresponding to the start time is a point offset by a second offset with respect to a second specified reference point, and the second specified reference point is a start point of an on-duration configured for the short cycle of each DRX group or a start point configuration of an on-duration configured for a shorter short cycle in the DRX group currently entering in the short cycle; and a transmission cycle of the power-saving signal of the short cycle, wherein the transmission cycle is the short cycle of each DRX group or a shorter value configuration of the short cycle in the DRX group currently entering in the short cycle.

10. The method according to claim 7, wherein, the power-saving signal is wake up signaling (WUS) or go to sleep (GTS).

11. The method according to claim 7, wherein the different power-saving signal configurations configured for the long cycle and the short cycle of the at least one DRX group comprise:

configuring the power-saving signal for the long cycle of the DRX group, and not configuring the power-saving signal for the short cycle of the DRX group.

12. A non-transitory storage medium, storing an executable program, wherein the executable program implements, when executed by a processor, steps of the method for processing discontinuous reception (DRX) according to claim 7.

13. An apparatus for processing discontinuous reception (DRX), comprising:

a processor; and a memory configured to store processor executable instructions; wherein, the processor is configured to:

configure different power-saving signal configurations for a long cycle and a short cycle of at least one DRX group, wherein different DRX groups are set according to different radio frequency chains used by a user equipment (UE);

wherein the processor is configured to configure different power-saving signals for the long cycle and the short cycle of the DRX group;

wherein the power-saving signal configurations comprise signal parameters for configuring power-saving signals;

wherein the signal parameters comprise;

an effective range of a power-saving signal of the long cycle, wherein the effective range is long-cycle DRX group in all the DRX groups;

start and end time of the power-saving signal of the long cycle, wherein the start and end time comprises start time, a time point corresponding to the start time is a point offset by a first offset with respect to a first specified reference point, and the first specified reference point is a start point of an on-duration configured for long cycles of all the DRX groups; and a transmission cycle of the power-saving signal of the long cycle, wherein the transmission cycle is the long cycle of all the DRX groups.

14. The apparatus according to claim 13, wherein the processor is configured to:

configure the power-saving signal for the long cycle of the DRX group, and not configure the power-saving signal for the short cycle of the DRX group.

15. An apparatus for processing discontinuous reception (DRX), comprising:

a processor; and a memory configured to store processor executable instructions; wherein, the processor is configured to: implement the method for processing discontinuous reception (DRX) of claim 7 when executing the executable instructions.

* * * * *